United States Patent [19]

Miller et al.

[11] Patent Number: 4,921,736

[45] Date of Patent: May 1, 1990

[54] LOW FRICTION, WEAR RESISTANT PLASTIC PARTS

[75] Inventors: George T. Miller, Lewiston; Russell J. Morgan, Grand Island, both of N.Y.

[73] Assignee: Occidental Chemical Corporation, Niagara Falls, N.Y.

[21] Appl. No.: 256,422

[22] Filed: Oct. 12, 1988

[51] Int. Cl.$^5$ .......................... B32B 17/02; F16J 1/00
[52] U.S. Cl. ..................................... 428/36.4; 92/248; 428/34.5; 428/35.7; 428/446; 428/524; 428/688
[58] Field of Search .................... 428/34.5, 36.4, 35.7, 428/446, 524, 688; 92/248; 156/625, 662, 657; 264/340; 252/79.3

[56] References Cited

U.S. PATENT DOCUMENTS

| | | | |
|---|---|---|---|
| 3,266,963 | 8/1966 | Stearns | 252/79.3 |
| 3,992,221 | 11/1976 | Homsy et al. | 264/83 |
| 3,997,935 | 12/1976 | Porter et al. | 264/340 |
| 4,170,926 | 10/1979 | Emmett | 92/248 |
| 4,298,424 | 11/1981 | Terada et al. | 252/79.3 |
| 4,401,012 | 8/1983 | Emmett | 92/248 |
| 4,775,557 | 10/1988 | Bastenbeck et al. | 156/668 |

*Primary Examiner*—Jose Dees
*Assistant Examiner*—Archene A. Turner
*Attorney, Agent, or Firm*—James F. Tao; James F. Mudd

[57] ABSTRACT

Plastic molded articles having low friction and excellent wear resistance are produced by treating the surface of the plastic article with an aqueous solution of an inorganic fluoride such as hydrogen fluoride. Plastic articles which can be made in accordance with the invention include plastic brake pistons, bearings, motors and drives, commutators, slip ring alternators for DC drive motors, thrust washers, spacers and reactors, clutch plates, electrical switching equipment with sliding parts, gears, pulleys for belt drives, such as cog belt pulleys, V-belt pulleys and poly V-belt pulleys, gas meter discs, and the like. In addition to the treatment step, the plastic articles are neutralized, washed and dried.

7 Claims, 2 Drawing Sheets

LOW FRICTION, WEAR RESISTANT PLASTIC PARTS

BACKGROUND OF THE INVENTION AND INFORMATION DISCLOSURE STATEMENT

1. Field of the Invention

The invention relates to plastic articles or parts that exhibit low friction and good wear resistance. The invention more particularly relates to an improved piston for disc brakes, such as vehicular disc brakes, particularly automotive disc brakes. The present invention relates to an improved plastic brake piston for use in anti-skid or anti-lock vehicular brake systems, now commonly known as the "ABS" system.

Although the present invention will be described in terms of disc brakes, particularly intended for motor vehicles, it will be understood that the present improved piston is equally adaptable to piston brakes utilized on aircraft and railroad vehicles and other hydraulic or air-activated pistons.

One type of brake assembly presently in use in motor vehicle disc brakes is the opposed piston type. In such type, a piston is positioned adjacent each opposite side of a brake disc and forces its respective brake shoe or lining against the disc to impart a braking action. Other types of brake assemblies in which the present invention is equally useful are those in which a single piston is utilized to move the brake shoe or lining into contact with both sides of the brake disc by utilizing a caliper slide to impart a braking action.

Upon the advent of the use of disc brakes in motor vehicles, the pistons used were metallic, usually fabricated of chrome plated iron or steel, and required several time consuming and costly machining operations. More recently, pistons for disc brakes have been fabricated of a plastic material, usually a phenolic resin molding compound. Such pistons may be produced by molding techniques known in the art. The molded plastic pistons are generally machined to achieve close dimensional tolerance.

2. Prior Art

Plastic pistons are described in U.S. Pat. No. 4,170,926, the disclosure of which is incorporated herein by reference.

Additional modified plastic pistons are disclosed in U.S. Pat. No. 4,401,012, the disclosure of which is incorporated herein by reference.

The plastic pistons made in accordance with the above-disclosed patents are very serviceable in conventional brake systems.

However, in the new ABS braking systems, brake manufacturers have seen wear on the outside surfaces of the pistons when the pistons are subjected to static testing. Piston wear occurs where the piston is in direct contact and slides against the steel or aluminum caliper bore. Steel pistons also have been observed to develop wear marks.

It is a purpose of this invention to reduce friction or eliminate the wear on plastic articles and parts, for example, on the outside walls of the plastic brake piston, particularly those made from phenolic molding compounds.

U.S. Pat. No. 3,992,221 discloses treating the surface of an extensible hydrocarbon article, such as a rubber glove, by positioning the article in a chamber from which extraneous oxidizing agents are excluded, extending the article, and treating the extended surface with a fluorinating gas which may contain elemental fluorine. The treatment of the non-filled elastomer provides improved frictional characteristics, chemical inertness, and other desirable properties.

SUMMARY OF THE INVENTION

The purposes of the invention are achieved by a process of modifying the surface profile of a filled plastic article resulting in improved friction and wear properties of the plastic article. The surface modification can involve chemical modification.

The purposes of the invention are achieved by providing a plastic molded article containing a filler wherein the surface of the article has been treated with an aqueous solution of an inorganic fluoride.

More particularly, the purposes of the invention are achieved by providing a plastic vehicular brake piston wherein the surfaces of said piston have been treated with an inorganic fluoride such as hydrogen fluoride. The plastic pistons of the invention generally comprise a cylindrical resin body having an open end and a closed end. The resin is preferably a phenol-aldehyde molding compound. The molded plastic pistons are usually machined to achieve close dimensional tolerances.

The improved plastic pistons of the invention are obtained by treating the surfaces of the plastic piston with an inorganic fluoride which removes and/or modifies filler material protruding from the machined surface of the molded plastic piston.

The improved plastic pistons of the invention do not show wear when used in commercial braking systems.

Other uses for the treatment of the invention are found in the manufacture of the following plastic parts and in other plastic applications where low friction and wear resistance are desired:

1. Bearings—Motors—Drives—Lubricated and dry.
2. Commutators (starter motor type) where the spaces between bars are flush with the surface. For improved brush/motor life.
3. Slip ring alternators for DC drive motors.
4. Thrust washers—for example, automotive transmission, thrust washers, spacers and reactors.
5. Clutch plates.
6. Electrical switching equipment—sliding parts.
7. Gears.
8. Pulleys for belt drives, such as cog belt pulleys, V-belt pulleys and poly V-belt pulleys.
9. Gas meter discs.

DETAILED DISCLOSURE OF THE INVENTION

The Plastic Articles

Figure 1A:
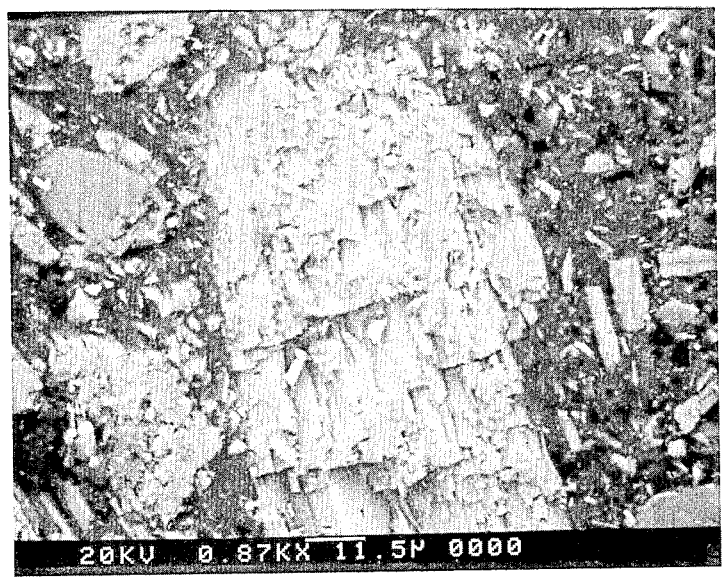
FIG. 1A is a photomicrograph of the surface of a piston made from a phenol-formaldehyde molding compound, wherein the surface has been machined, but not treated in accordance with the invention.

The preferred plastic for use in making the articles, such as pistons, of the invention is a thermosetting resin molding compound such as a phenol-aldehyde resin filled with one or more filler materials. Other mineral-filled thermosetting plastics can also be used, such as polyesters, melamines, epoxy resins, and urea resins.

Suitable filler materials are glass fibers of various lengths and diameters, and inorganic fillers such as metal silicates such as calcium silicates. Various silicon bearing fillers can be employed.

A typical plastic piston is comprised of a cylindrical plastic body having an open end and a closed end. The "closed end" can be cored out for structural and other purposes and is deemed to be within the foregoing description.

The outer walls of molded plastic pistons are usually machined to achieve close dimensional tolerances.

The improved disc brake plastic piston of the present invention can have a metallic cap or face which provides a heat shield, provides a means of attaching a brake shoe or a brake shoe assembly, or provides a dust boot groove. In another mode, the metallic cap component provides both a brake shoe retaining means, such as a brake shoe clip, and a dust boot groove. Such modified pistons are disclosed in U.S. Pat. No. 4,401,012.

The Treatment

The molded and machined plastic articles, such as plastic pistons, are treated in an aqueous solution of an inorganic fluoride. Preferred is hydrogen fluoride. But other fluorides can be used such as sodium fluoride, potassium fluoride, sodium fluoroborate, sodium fluorosilicate, sodium bifluoride, and the like.

The fluoride concentration in the aqueous solution is about 5 to 80 weight percent of fluoride compound, preferably about 30 to 70 weight percent, and usually about 50 weight percent of the weight of solution.

The machined and molded plastic pistons are dipped in the aqueous fluoride solution for a period of time from about 1 second to 10 minutes, preferably about 3 to about 60 seconds.

Ambient temperatures are usually employed, but temperatures in the range of about 5 to 50° C. can be used, preferably about 15 to about 35° C.

The principal reaction of the treatment process ($4HF + SiO_2 \rightarrow SiF_4 + 2H_2O$) does not significantly decrease the acid compound in the treatment solution, since the moles of acid by far exceed the moles of silicon compound being attacked. The replenishing of the acid which is lost by carry-over from the treating solution, more than compensates for the neutralization caused by the water by-product of the reaction. The other by-product, $SiF_4$ (gaseous silicon tetrafluoride) is hazardous and proper ventilation and scrubbing must be present not only to vent the $SiF_4$ but also the HF fumes.

The acid solution that adheres to the treated plastic pistons is neutralized to remove residual acid. The neutralization bath used for this purpose should contain a cation that will react with a fluoride ion to form an insoluble fluoride salt, and an anion that will maintain a basic pH in the neutralization bath. Suitable cations that form insoluble salts are calcium and magnesium. Suitable anions that maintain a basic pH include hydroxide, oxide, carbonate and bicarbonate. The foregoing cations and anions can be provided by a single compound such as calcium or magnesium hydroxides, oxides, carbonates and bicarbonates. The desired cation and anion can also be provided by using two or more compounds. Other compounds of calcium and magnesium that form insoluble salts with fluoride ions include calcium chloride, magnesium chloride, calcium sulfate, magnesium sulfate, calcium acetate, magnesium acetate, calcium citrate, magnesium citrate, calcium gluconate, magnesium gluconate, and the like. Other basic compounds that provide the necessary pH but which do not form insoluble salts with fluoride ions include ammonia, and hydroxides of Group I metals such as sodium hydroxide, potassium hydroxide, hydroxides of Group II metals such as zinc hydroxide and barium hydroxide and the corresponding oxides, carbonates and bicarbonates of sodium, potassium, zinc and barium.

The neutralization bath should be monitored both by pH and by fluoride ion concentration (fluoride electrodes are commercially available). There is acid carry-over into the bath from the treatment step. If the bath is not refreshed, the bath will become useless at some point. The starting pH of the saturated basic solution is 14. When the pH goes down to about 11 the solution should be refreshed by adding the above disclosed compounds so that it remains an effective neutralizer of acidity and reactant for free fluoride ions.

The treated and neutralized plastic pistons are washed one or more times with water and dried.

In the following examples and throughout the specification and claims, parts are by weight and temperatures are in degrees Celsius, unless indicated otherwise.

EXAMPLES

Example 1

A series of runs were made using pistons made from two commercial phenol-formaldehyde molding compounds designated as Durez 29502 and Durez 32450.

The properties of molded specimens of these molding compounds are shown in Tables 1 and 2.

TABLE 1

| DUREZ 29502 | | |
|---|---|---|
| Molded Properties | Value | ASTM Method |
| Specific Gravity | 2.07–2.17 | D792 |
| Molding Shrinkage, in./in., Compression | .001–.003 | D955 |
| Transfer | .001–.003 | D955 |
| Water Absorbtion, Percent | 0.1 maximum | D570 |
| Impact, Izod, ft. lb/in.* | 0.35 minimum | D256 |
| Flexural Strength, psi* | 10,000 minimum | D790 |
| Tensile Strength, psi* | 6,000 minimum | D638 |
| Compressive Strength, psi* | 27,000 minimum | D695 |
| Defl. Temperature, °F., 264 psi | 350° F. (176° C.) minimum | D648 |
| Modulus in Tension, psi | $2.5 \times 10^6$ minimum | D638 |

TABLE 1-continued

DUREZ 29502

| Molded Properties | Value | ASTM Method |
|---|---|---|
| Coefficient of Linear Thermal Expansion (per °C. × 10°, 30–60° C. range) | 15–20 typical | D696 |

ASTM specimens were prepared by compression molding at 340° F. (171° C.) Conditions; *48 hours @ 50° C. and tester at 23° C.

TABLE 2

DUREZ 32450

| Molded Properties | Convention Units | International System of Units | ASTM Method |
|---|---|---|---|
| Specific Gravity | 2.16–2.18 | 2.16–2.18 | D792 |
| Molding Shrinkage | 0.001 in/in | 0.001 m/m | D955 |
| Water Absorption | .05% | .05% | D570 |
| Impact, Izod | 0.40 ft. lb/in | 21 J/M | D256 |
| Flexural Strength | 13,000 psi | 90 MPa | D790 |
| Tensile Strength | 7,500 psi | 52 MPa | D638 |
| Compressive Strength | 37,000 psi | 255 MPa | D695 |
| Deflection Temperature | 475° F. | 245° C. | D648 |
| Modulus in Tension | $3.0 \times 10^6$ psi | 20 GPa | D638 |
| Rockwell Hardness (E) | 105–110 (post-baked) | | D785 |

The results of static wear tests run on pistons made from the commercial molding compounds and finished as shown in Table 3 and are shown under Test Results in Table 3.

In Run 4, the piston was treated for 5 seconds with 50 weight percent HF in water at 22° C., followed by rinsing in a lime soda slurry, and then in water.

TABLE 3

STATIC WEAR TESTS (ABS*)
Example 1

| Run Number | Material | Finish | Test Results |
|---|---|---|---|
| 1 | 29502 | Standard 20–40 micro inch | Significant wear observed |
| 2 | 32450 | Standard 20–40 micro inch | Some pistons show wear |
| 3 | 32450 | Smooth and polish/less than 16 micro inch | Some slight marks |
| 4 | 32450 | Smooth and treated | No wear under any conditions |

*Automatic Braking System

In the preceding runs, when the surface of the untreated piston was observed at 100 to 3000 magnification, or even lower magnification, on an electron microscope, the surface of the untreated piston was observed to be very rough with exposed glass and mineral protruding from the surface with sharp fractured edges. Treated pistons compared on the same magnification, showed the rough points of glass and mineral to be smooth by comparison resulting in a surface with low friction and resistant to wear when placed in contact with a steel caliper surface.

Example 2

Other treatment conditions that gave satisfactory results included the following: (All percentages were by weight.)

| | % HF | Time |
|---|---|---|
| (A) | 5 | 10 min. |
| | 10 | 2 min. |
| | 10 | 1 min. |
| | 50 | 1 min. |
| | 50 | 10 sec. |
| | 50 | 1 sec. |
| (B) | NaF (10%) | 10 min. |
| | NaF (10%) + HCl (10%) | 2 min. |
| | KF (10%) + HCL (10%) | 2 min. |
| | NaHF$_2$ (10%) | 1 min. |
| | Na$_2$SiF$_6$ (10%) | 5 min. |
| | NaBF$_4$ (10%) | 5 min. |

DETAILED DESCRIPTION OF THE FIGURES

The outer surface of a piston molded from Durez 29502 phenolformaldehyde molding compound was machined to tolerance. The machined surface was photomicrographed at 870 magnification. The photomicrograph is shown in FIG. 1A. The surface was rough with exposed filler material protruding from the surface of the piston.

Figure 1B:
FIG. 1B is a photomicrograph of the surface of a piston made from a phenol-formaldehyde molding compound, wherein the surface has been machined, and treated in accordance with the invention.

The outer surface of a piston molded from Durez 29502 phenolformaldehyde molding compound was machined to tolerance. The machined pistons were treated with aqueous hydrogen fluoride solution in accordance with the invention. The machined and treated surface of the piston was photomicrographed at 900 magnification. The photomicrograph is shown in FIG. 1B. The figure shows the filler material to be smooth by comparison with FIG. 1A.

Figure 2A:
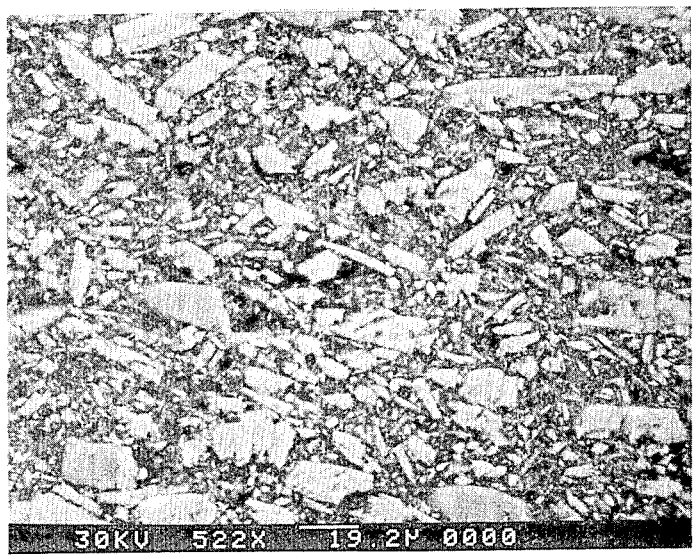
FIG. 2A is a photomicrograph of the surface of a piston made from a phenol-formaldehyde molding compound, wherein the surface has been ground, but not treated in accordance with the invention.

The outer surface of a piston molded from Durez 32450 phenolformaldehyde molding compound was ground to tolerance. The ground surface was photomicrographed at 522 magnification. The photomicrograph is shown in FIG. 2A. The surface was rough with exposed filler material protruding from the surface of the piston.

Figure 2B:
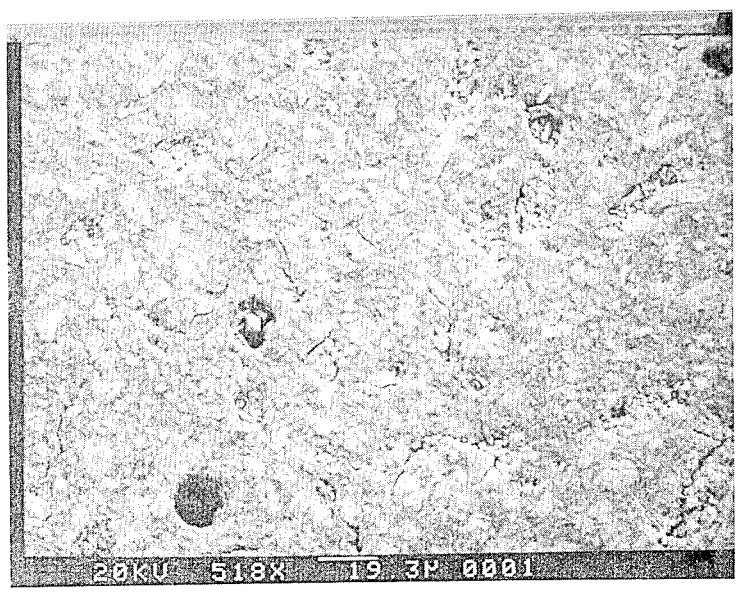
FIG. 2B is a photomicrograph of the surface of a piston made from a phenol-formaldehyde molding compound, wherein the surface has been ground, and treated in accordance with the invention.

The outer surface of pistons molded from Durez 32450 phenolformaldehyde molding compound were ground to tolerance. The ground pistons were treated with aqueous hydrogen fluoride solution in accordance with the invention. The treated surface of the piston was photomicrographed at 518 magnification. The photomicrograph is shown in FIG. 2B. The figure shows the filler material points to be smooth by comparison with FIG. 2A.

I claim:

1. A molded plastic vehicular brake piston containing a silicon based filer wherein the surfaces of said piston have been treated with an aqueous solution consisting essentially of an inorganic fluoride.

2. A piston according to claim 1 comprised of a cylindrical resin body having an open end and a closed end.

3. A piston according to claim 2 wherein the resin is a phenol aldehyde molding compound.

4. The piston of claim 1 wherein the inorganic fluoride is hydrogen fluoride.

5. The piston of claim 1 wherein the inorganic fluoride is sodium fluoride or potassium fluoride.

6. The piston of claim 1 wherein the inorganic fluoride is sodium fluoborate, sodium fluorosilicate or sodium bifluoride.

7. A molded plastic vehicular brake piston containing a silicon based filler wherein the surfaces of said piston have been treated with an aqueous solution consisting essentially of hydrogen fluoride, wherein the piston is comprised of a cylindrical resin body having an open end and a closed end, and wherein the resin is a phenol aldehyde molding compound.

* * * * *